Patented Oct. 2, 1928.

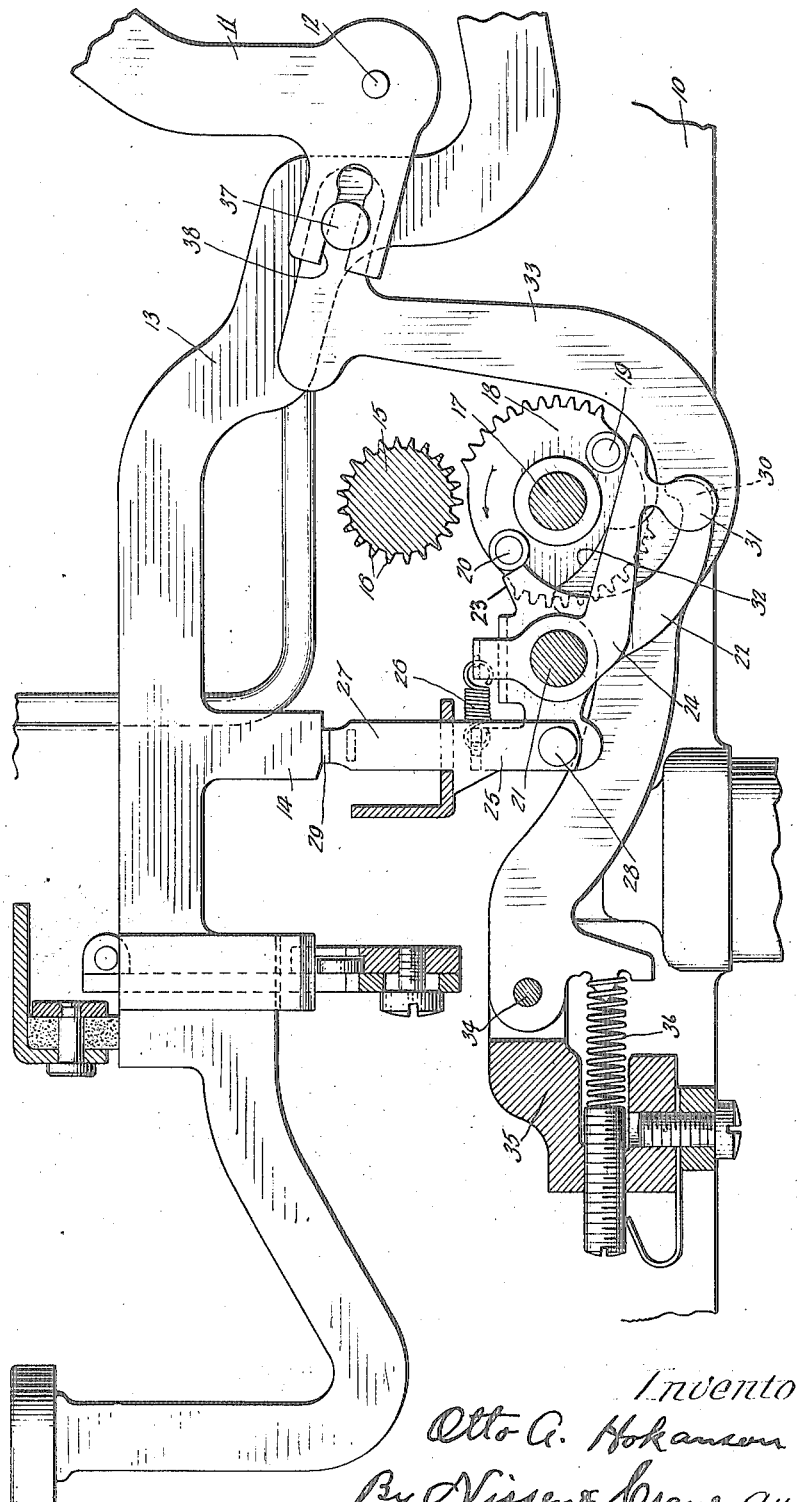

1,685,782

UNITED STATES PATENT OFFICE.

OTTO A. HOKANSON, OF WOODSTOCK, ILLINOIS, ASSIGNOR TO WOODSTOCK TYPEWRITER COMPANY, OF WOODSTOCK, ILLINOIS, A CORPORATION OF ILLINOIS.

POWER-OPERATING MECHANISM FOR TYPEWRITERS.

Application filed April 28, 1924. Serial No. 709,329.

This invention relates to a power drive for typewriting machines, and has for its object the provision of such a device, which shall be of improved construction and operation and which shall provide positive means for connecting the typewriter mechanism with the source of power. The invention is exemplified in the combination and arrangement of parts shown in the accompanying drawing and described in the following specification, and it is more particularly pointed out in the appended claims.

In the drawing: The figure is a somewhat diagrammatic vertical section through a typewriting machine showing one embodiment of the present invention applied thereto.

As illustrated, the numeral 10 designates the base frame of a typewriting machine having type bar 11 pivoted at 12 thereon, in a well known manner, such as that employed in the Woodstock typewriter. A plurality of key levers 13, are provided, each having a downwardly extending contact member 14. A toothed cylinder 15, having its gear teeth 16 extending longitudinally thereof, is journaled in the side plates of the frame 10, and is continuously rotated by any suitable source of power, such as an electric motor, not shown. A shaft 17 is also journaled in the machine frame and extends parallel with the gear cylinder 15. The shaft 17 carries a plurality of mutilated gears or discs 18, spaced along its length in position to mesh with the teeth on the cylinder 15. Each gear 18 carries a pair of rollers 19 and 20, projecting from its lateral face. A second shaft 21 is arranged parallel with the shaft 17 and carries a plurality of escapement dogs 22, each having an abutment 23 in position to intercept the rollers on the mutilated gears. At the side of each dog 22 is a spring lever or dog 24 connected with an extension 25 on the dog 22, by means of a spring 26. The long arm of the lever or dog 24 is urged against the roller 19 tending to rotate the gear 18 in the direction of the arrow. Rotation is normally prevented by the stop 23 on the escapement dog 22. A plunger 27 is pivoted at 28 to each of the escapement dogs 22 and has a contact member 29 in the path of the projection 14 on the key-lever 13. When the key lever is depressed, the stop 23 is moved out of the path of the roller 20, and the spring lever 24 rotates the gear 18 until its teeth mesh with the teeth on the roller 15. Depression of the key lever brings the lower hooked end 30 of the escapement dog 22 into the path of the roller 20, so that after the teeth of the gear 18 have passed out of mesh with the roller 15, the gear will be arrested by the hook 30, engaging the roller 20. When the key lever is released, the roller 20 will be further moved by the spring lever 24 until the roller 19 is stopped by the abutment 23. An extension plate or projection 31 is provided on the lever or dog 24 to prevent the nose of the hook 30 from catching on the lower edge of the lever 24.

Each time the gear 18 is thus given a half revolution one of the rollers 19 and 20 strikes a cam surface 32, on an actuating lever 33, which is pivoted at 34 on a cross bar 35, carried by the frame 10. A spring 36 normally holds the actuating lever 33 in its uppermost position. The actuating lever 33 is pivoted at its rear end to the sub-lever 11 by means of a pivot 37 and slot 38. The sub-levers 11 actuate the type bars whenever the actuating lever 33 is moved downward. This occurs each time one of the rollers 19 or 20 is moved in contact with the cam surface 32. The shaft 17 and the roller 15 may have their axes spaced a fixed distance from one another, and it is not necessary to have them resiliently supported to permit relative movement, as is the case where frictional engagement between the parts is employed. It will be seen that a positive drive is provided for the type bars and the various actuating units are selectively controlled by slight depressions of the key levers 13.

I claim:

1. In a typewriting machine, a type-bar actuating member, a toothed gear arranged to engage said member to impart movement thereto, a continuously rotating power-driven toothed gear, and key-controlled means for operatively connecting said gears to operate said type-bar actuating member, said gears having relatively fixed axes of rotation.

2. In a typewriting machine, a type bar actuating member, a drive gear, a toothed gear normally out of mesh with said drive gear, and a key lever for operating the toothed gear to engage the drive gear and operate the type bar actuating member, said toothed gear having a fixed axis of rotation and one of said gears having a portion of the periphery thereof blank.

3. In a typewriting machine, a rotating power-driven member, a second rotating member having a fixed axis of rotation and arranged to operatively engage said first member in one angular position thereof, a rigid lever operatively connected with said second rotatable member, and a spring connected with said rigid lever and normally tending to move said second rotatable member into said angular position.

4. In a typewriting machine, a rotating power-driven member, a second rotatable member arranged to operatively engage said first-named member when said second member is in one angular position of rotation about the axis thereof, a pair of control dogs for said second rotatable member, and a common spring exerting force on one of said dogs tending to rotate said second rotatable member, and also yieldingly holding the other of said dogs in position to prevent rotation of said second rotatable member.

5. In a typewriting machine, a power-driven member, a pair of dogs arranged adjacent one another for controlling the movement of said member, and a projection on one of said dogs overlapping the other to prevent interference between said dogs.

6. In a typewriting machine, a power-driven member, a pair of dogs arranged adjacent one another for controlling said member, a projection on one of said dogs overlapping the other to prevent interference between said dogs, and a common spring for holding said dog in operative relation with said power-driven member.

7. In a typewriting machine, a power-driven member, a dog tending to rotate said member, a second dog arranged to hold said member against rotation, said dogs having a common pivotal axis, a type bar actuating member arranged to be operated by said power-driven member when rotated, and a key lever for rotating said second dog about said axis for releasing said second dog to permit rotation of said member.

8. In a typewriting machine, a mutilated toothed gear having a fixed axis of rotation, a power-driven toothed gear for operating said mutilated gear, a dog tending to rotate said mutilated gear into operative relation with said power-driven gear, a second dog for holding said mutilated gear against rotation, a key lever for releasing said second dog to permit rotation of said mutilated gear by said first dog into operative engagement with said power-driven gear, and a type-bar actuating member arranged to be operated by said mutilated gear when rotated by said power-driven gear.

9. In a typewriter, a power driven rotary toothed member, a second toothed member arranged to mesh with the teeth of said first toothed member, key controlled mechanism for effecting engagement between said toothed members, said second-named toothed member having a fixed axis of rotation, an operating member for said typewriter having a cam surface thereon, and means on said second-named toothed member for engaging said cam surface to actuate said operating member.

10. In a typewriter, a type bar, an operating member for said type bar having a cam surface thereon, a rotary disc having a fixed axis of rotation, means on said rotary disc for engaging said cam surface to actuate said operating member, teeth formed on a portion only of the periphery of said rotary disc, a power driven member having teeth thereon for engaging the teeth of said rotary disc, and key controlled means for effecting engagement between the teeth of said rotary disc and said power driven member.

In testimony whereof I have signed my name to this specification on this 24th day of April, A. D. 1924.

OTTO A. HOKANSON.